W. FENTZLOFF.
DEFLECTOMETER.
APPLICATION FILED JULY 26, 1909.

997,980.

Patented July 18, 1911.

2 SHEETS—SHEET 1.

Witnesses:
Jean Grund.
Carl Grund.

Inventor:
Wilhelm Fentzloff

COLUMBIA PLANOGRAPH CO., WASHINGTON, D. C.

W. FENTZLOFF.
DEFLECTOMETER.
APPLICATION FILED JULY 26, 1909.

997,980.

Patented July 18, 1911.

2 SHEETS—SHEET 2.

Fig. 2ª

Witnesses:
Jean Grund
Carl Grund

Inventor:
Wilhelm Fentzloff

UNITED STATES PATENT OFFICE.

WILHELM FENTZLOFF, OF FRANKFORT-ON-THE-MAIN, GERMANY.

DEFLECTOMETER.

997,980.   Specification of Letters Patent.   Patented July 18, 1911.

Application filed July 26, 1909. Serial No. 509,564.

*To all whom it may concern:*

Be it known that I, WILHELM FENTZLOFF, a subject of the German Emperor, and residing at Frankfort-on-the-Main, Germany, have invented certain new and useful Improvements in Deflectometers, of which the following is a specification.

My invention relates to deflectometers for measuring lineal movements or deflections with the aid of a draw-member passed between a friction roller, carrying the indicating means, and a spring-pressed member.

An important object of my invention is to withhold all exterior accessory influences from the real indicating device, for which reason it is arranged in a closed casing, having a transparent cover, fixed on the frame. The stationary journaled friction roller carrying the indicating means must penetrate the rear wall of the casing and has its free end journaled in a cross-piece inserted in the casing.

In order that my invention may be clearly understood I will now explain the same with reference to the accompanying drawings in which some embodiments are represented by way of example.

Figure 1:
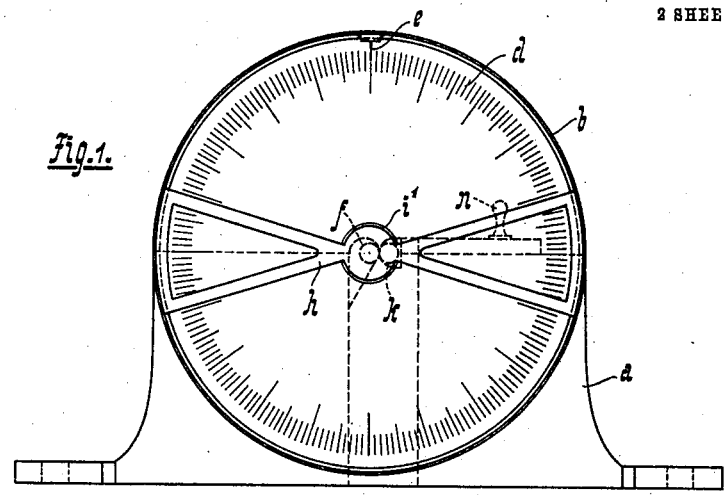
Figure 2:
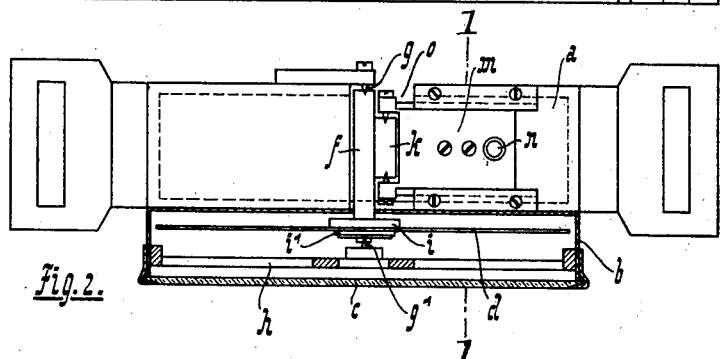
Figure 3:
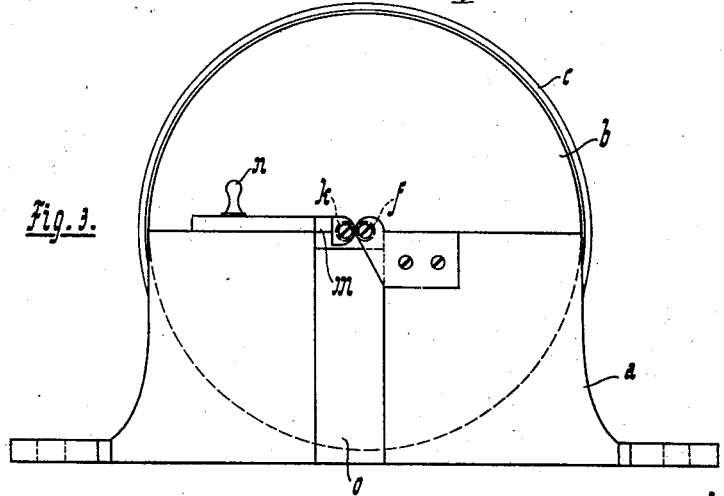
Figure 4:
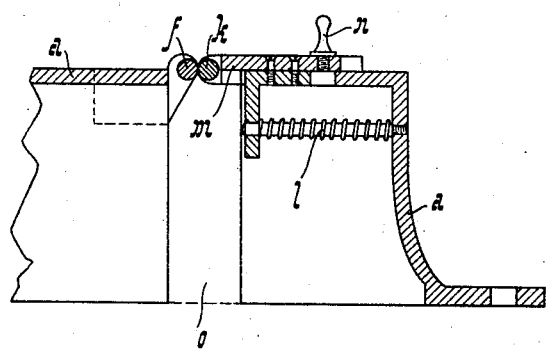
Figure 5:
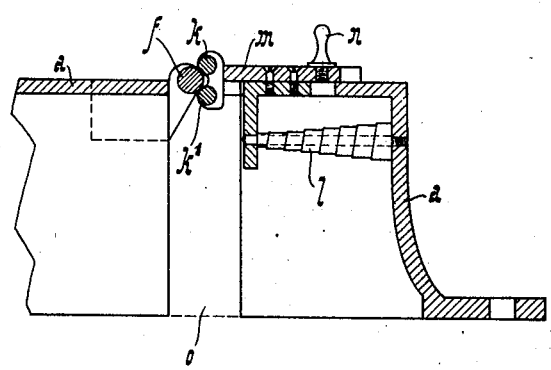
Figure 6:
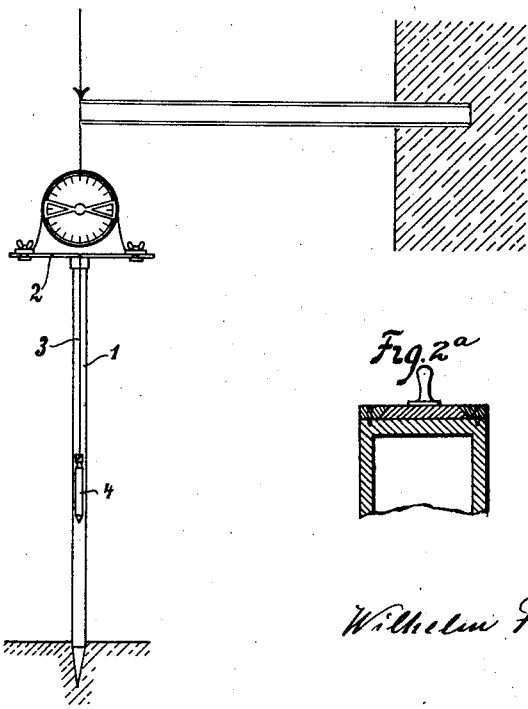

In said drawings: Figure 1 is a front elevation. Fig. 2 a top plan view, the casing being shown in horizontal section. Fig. 2ª a cross-section of a detail along the section-line 1—1 of the Fig. 2, and Fig. 3 a rear elevation of my deflectometer, whereas Fig. 4 is a vertical section showing the arrangement of the friction roller and press-member, Fig. 5 is a like view showing a special form of the press-member, and Fig. 6 is an elevation partly in section, showing one mode in which the apparatus may be used.

Referring to the drawings, the apparatus comprises a hollow frame $a$ which carries in front a circular casing $b$ which is closed in front by a preferably removable glass cover $c$. In this casing $b$ are arranged the revoluble graduated disk or dial $d$ and the pointer $e$ fixed to the casing. The dial $d$ is balanced and fixed centrically on the friction roller $f$ which is journaled betwen preferably adjustable points or centers $g$, $g^1$ and can rotate in either direction. The front center $g^1$ is attached in a cross-piece $h$ inserted in the casing $b$. The friction roller $f$ penetrates the rear wall of the casing $b$ and has within the latter a collar $i$, against which the dial $d$ is placed firmly centrically with the aid of a detachable plate $i^1$.

The press-member consists of a second roller $k$ arranged and held exactly parallel to the friction roller $f$, this second roller being journaled, likewise preferably in adjustable points or centers, in a slide $m$ guided rectilinearly along the frame and under the action of a spring $l$. The spring $l$ influencing this press-member $k$ is arranged in the chamber or space in the frame $a$ and removed from all possible exterior influences. For admitting of the passage of the draw-member in the form of a wire, band or the like there is provided between the friction roller and press-roll in the cover of the frame $a$ an opening which, for the purpose of conveniently placing the draw-member from the rear, can be enlarged to form a gap $o$ in the rear wall of the frame $a$. The slide $m$ is provided with a handle $n$ by which it can be drawn back, overcoming the spring $l$, so far that the draw-member can be placed conveniently between the friction roller and press-roll. The purpose of rectilinearly guiding the press-roll $k$ journaled in the slide $m$ is to move it in all positions exactly or parallelly lineally to the friction roller $f$, so that the draw-member is pressed uniformly everywhere and guarantees a uniform motion of the friction roller at whatever part of the length of the roller it is situated. The balanced dial $d$ responds to the slightest motion of the friction roller $f$ and remains at once in any position.

In the above described example the draw-member is pressed against the friction roller $f$ carrying the indicating means only at one point of contact or one contacting line. For very special and exceptional cases, under certain circumstances the friction produced in this manner may not be sufficient for giving an exact result. In order to remedy this defect, for very exceptional requirements, by increasing the friction the press-member may be made according to the form shown in Fig. 5. The press-member here consists of two rollers $k$ and $k^1$ which are arranged exactly parallel to the friction roller $f$ and so that they are located somewhat above and below it. Both the rollers are journaled likewise in centers in a forked member of the slide $m$ guided rectilinearly along the frame under the action of the spring $l$. Owing to this special arrangement of the two press-rolls $k$ and $k^1$ relatively to the friction roller $f$ carrying the indicating means, the draw-member passed between the rollers contacts with a larger portion of the exterior of the friction roller, and in this manner the friction with this roller increases and the certainty of its being driven or rotated. In all other respects the construction of the deflectometer is the same as that described above with reference to Figs. 1 to 4.

In consequence of the friction roller and press-roll being journaled on centers the described apparatus is exceedingly sensitive and in consequence of the uniform pressure of the draw-member on the friction roller $f$ its measurements are very exact.

The above described deflectometer is primarily intended for measuring deflections, particularly the elastic deflection of elevated structures, bridges, iron and concrete structures, and for other technical purposes. It can be erected in different ways, and operates equally reliably in every position, whether it is arranged stationary and the draw-member movable or, reversely, the draw-member stationary and the apparatus movable. It is suitable both for direct and indirect measurements.

One mode of employing the instrument is illustrated in Fig. 6. In this figure, 1 designates a tubular stand carrying a plate 2 which can be fixed at an optional, suitable height, stuck in the ground, on which plate the apparatus is screwed. For the purpose of conveniently erecting the apparatus transverse slots are provided in the frame of the apparatus and longitudinal slots in the plate 2 for the clamping screws. The upper end of the lineal draw-member in the form of a band 3 is connected with the object whose movement is to be measured. For the purpose of tensioning the draw-member it is loaded at its free end by a weight 4. For inserting the draw-member between the friction roller and press-roll the latter with its slide is moved backward somewhat and the draw-member is inserted between the two rollers. The press-roll is then allowed to return again and presses the draw-member against the friction roller. When the draw-member moves linearly the friction roller is driven and the amount of this movement is indicated by the rotation of the dial in combination with the stationary pointer.

Owing to the coöperation of the balancing of the revoluble indicating means placed on the friction roller, the journaling of the friction roller and press-roll between centers, the press-roll being pressed exactly rectilinearly, as well as the protective arrangement of the spring and the real indicating device in such manner that they are withheld from all exterior accessory influence, the greatest possible exactitude in measuring is obtained.

I claim:

1. In a deflectometer, the combination, with the frame, of a closed casing attached thereto, a cross-piece in said casing, an adjustable center on said cross-piece, a center on said frame, a friction roller arranged partially in said casing and journaled between said centers, said roller having a collar in said casing, indicating means on said roller, and a removable plate holding said indicating means against said collar.

2. In a deflectometer, the combination, with the frame, and a friction roller carrying indicating means revoluble on the frame, of a slide carrying a press-roll journaled in two centers carried by said slide, and a spring inside the bearing of said slide for pressing the slide toward said friction roller.

3. In a deflectometer, the combination, with the frame, and a friction roller carrying indicating means revoluble on the frame, of a closed casing attached to the front wall of said frame and inclosing said indicating means and a spring-pressed press-roll mounted revolubly and slidably on said frame normally contacting with said friction roller, the rear wall of said frame having a gap for the passage of a draw-member between the friction roller and the press-roll.

In witness whereof I have hereunto set my hand in presence of two witnesses.

WILHELM FENTZLOFF.

Witnesses:
JEAN GRUND,
CARL GRUND.

Copies of this patent may be obtained for five cents each, by addressing the "Commissioner of Patents, Washington, D. C."